G. W. WAGNER
AUTOMOBILE SIGNAL.
APPLICATION FILED JAN. 14, 1919
1,334,196.
Patented Mar. 16, 1920.
2 SHEETS—SHEET 1.
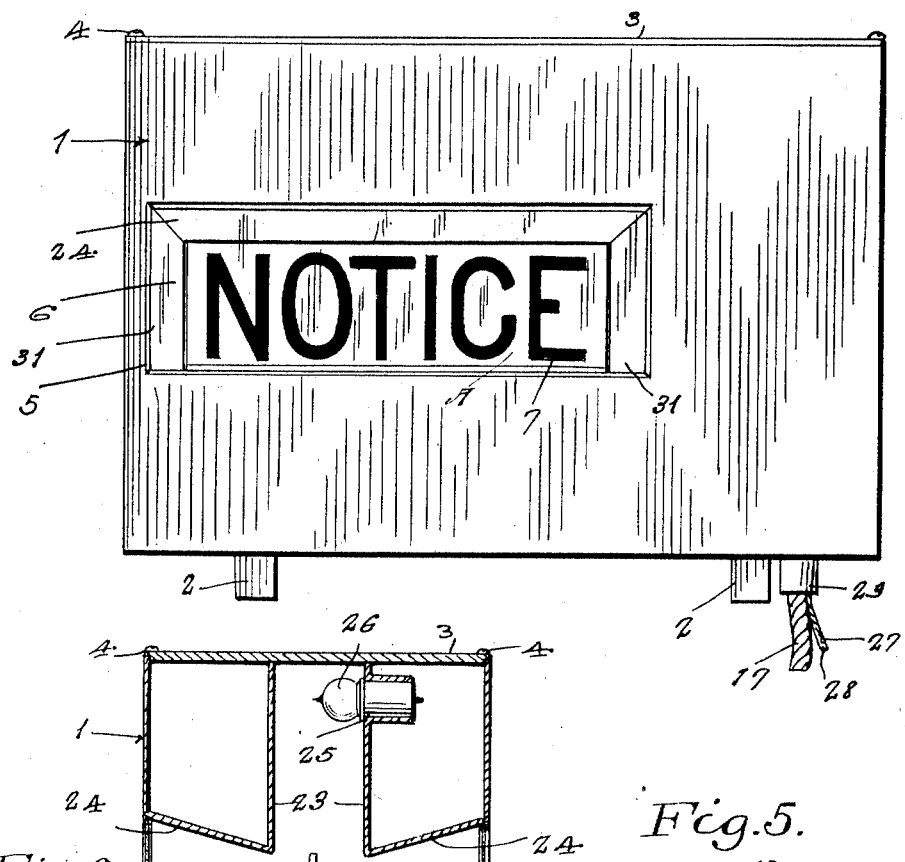
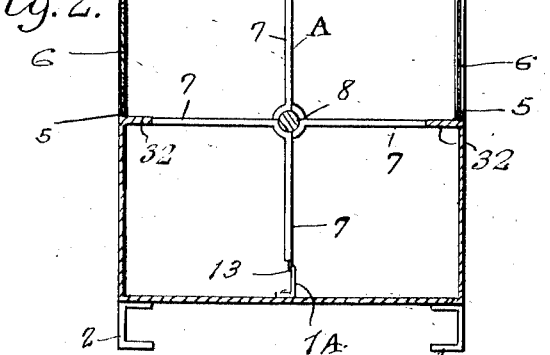
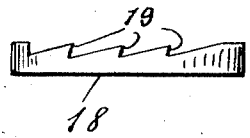
Inventor.
G. W. Wagner.
By
Attorney

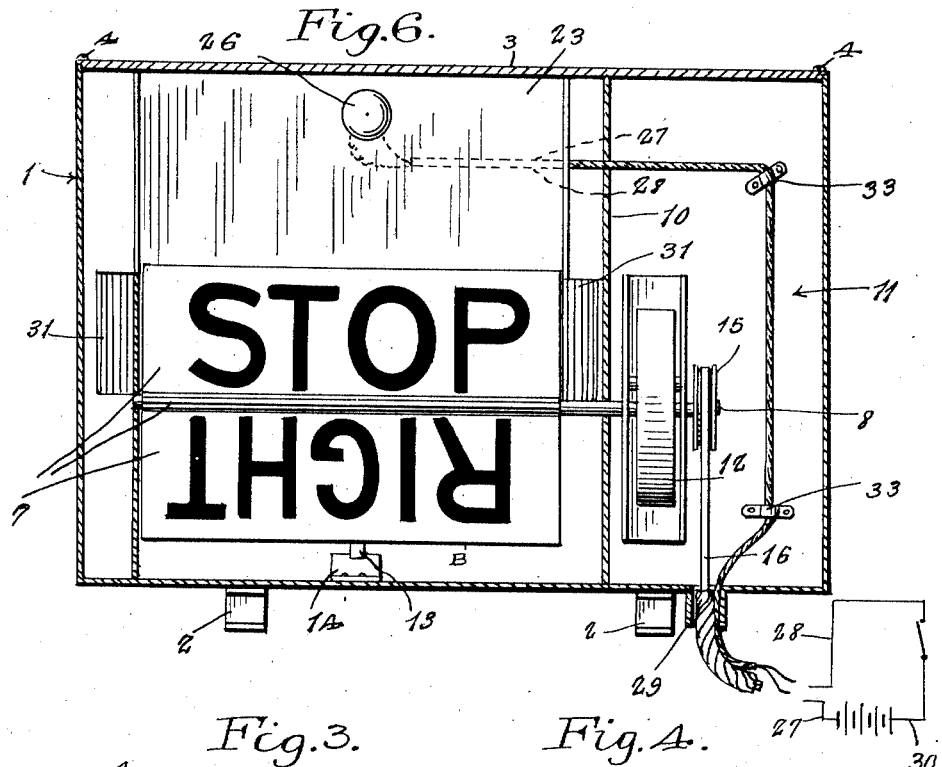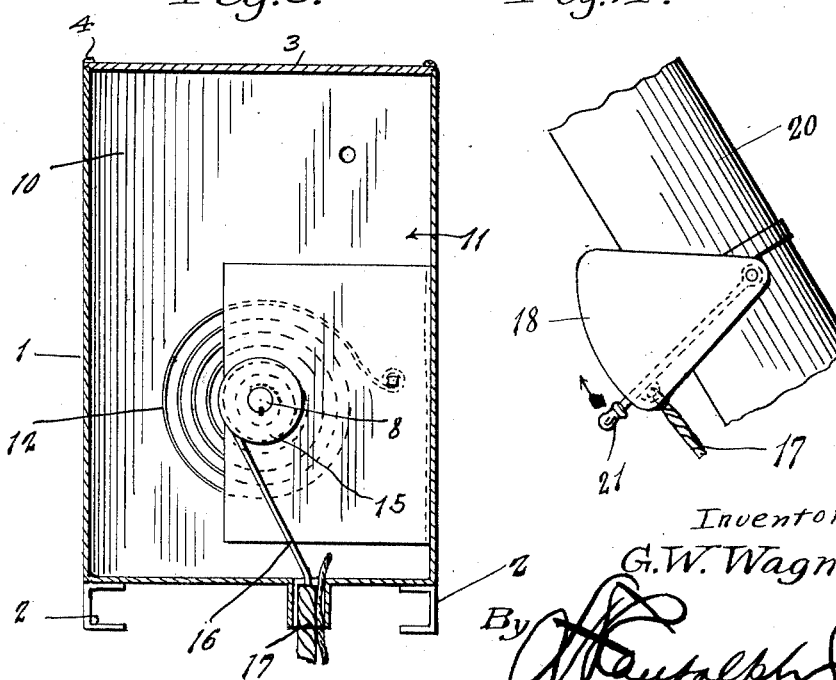

UNITED STATES PATENT OFFICE.

GERALD W. WAGNER, OF BELLAIRE, OHIO.

AUTOMOBILE-SIGNAL.

1,334,196. Specification of Letters Patent. Patented Mar. 16, 1920.

Application filed January 14, 1919. Serial No. 271,067.

*To all whom it may concern:*

Be it known that I, GERALD W. WAGNER, a citizen of the United States, residing at Bellaire, in the county of Belmont and State of Ohio, have invented certain new and useful Improvements in Automobile-Signals; and I do hereby declare the following to be a full, clear, and exact description of the invention, such as will enable others skilled in the art to which it appertains to make and use the same.

This invention relates to improvements in an automobile signal and has for one of its objects the provision of a device of this character whereby visible signals of different characters can be readily given by the operator of an automobile to indicate a turn from a straight course, or if a stop is contemplated, thus obviating the customary practice of the operator projecting an arm laterally of the automobile which at numerous occasions cannot be seen and which is not a definite signal.

Another object of this invention is the provision of revolving plates carrying signaling characters located in a casing that can be illuminated and which is provided with sight openings or windows so that on the operator actuating an operating means, the desired plate can be seen from the front and rear of the casing through the windows thereby informing traffic in front and rear of the respective automobile of the course to be taken or if a stop is to be made.

A further object of this invention is the provision of an automobile signal of the above stated character, which shall be simple, durable and efficient, and which may be manufactured and sold at a comparatively low cost.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which:—

Figure 1 is a front elevation of an automobile signal constructed in accordance with my invention, Fig. 2 is a transverse sectional view illustrating the front and rear windows, Fig. 3 is a transverse sectional view illustrating the means for automatically returning the plates to their initial position, Fig. 4 is a detail view of the controlling means carried by the steering post of an automobile, Fig. 5 is a plan view of the same, Fig. 6 is a plan view of the signal.

Referring in detail to the drawing, the numeral 1 indicates a substantially rectangular casing, having formed upon its bottom wall a pair of spaced lugs 2 adapted to be bolted or otherwise secured to an automobile at any desired point, preferably upon the rear left hand mud guard so that the device can be clearly observed from the front and rear of the respective automobile. The casing 1 is provided with a removable cover 3 secured in place by set screws or similar fasteners 4 so that the cover can be removed when desiring to gain access to the interior of the casing. The front and rear walls of the casing are provided with alined elongated openings or windows 5 closed by transparent panels 6 so that signal plates 7 located within the casing can be seen from the front and rear of the casing when moved in alinement with the windows 5. A shaft 8 is journaled within the casing and has mounted thereon the signal plates 7. The signal plates 7 are preferably coated with a dark material having the signal characters painted or otherwise applied thereon in white or light colors so that the signal can be readily observed. The signaling characters are painted or otherwise applied to both faces of the plate, so that when a plate is moved in front of the windows, the same signal can be observed from the front and rear of the casing. The signal plate designated by the character A normally occupies the position in view through the windows and preferably bears the signaling character "Notice" while the other plates have thereon the following signaling characters: "Stop," "Right" and "Left".

The casing 1 has a transverse partition 10 forming a journal for one end of the shaft 8 and also forming an extra compartment 11 within the casing. One end of the shaft 8 extends into the compartment 11 and has secured thereto one end of a clock spring 12 which has its other end secured to the casing so as to place the shaft 8 under tension. The plate B is provided with a projection 13 which is adapted to engage the stop 14 formed on the bottom wall of the casing for normally holding the plate A in front of the windows. The clock spring is adapted to be wound up in any well known manner and will normally hold the projection 13 against the stop 14. A grooved drum 15 is secured to the end of the shaft 8 located within the compartment 11 and has wound thereon and secured thereto a cable 16 which cable 16 is adapted to extend through a flexible housing 17 carried by the automobile. One end of the housing is secured to a substantially triangular shaped plate 18 having its upper edge provided with notches 19. The plate 18 is adapted to be secured to the steering post 20 or any other convenient part of the automobile and has pivoted to its apex thereof a controlling lever 21, which controlling lever is provided with a projection adapted to fit within the notches 19 of the plate for holding said lever against accidental movement. The free end of the flexible cable 16 is connected to the controlling lever and upon moving said controlling lever upon its pivot, the shaft 8 will be rotated against the tension of the spring moving the various signals in view through the windows, and upon releasing the controlling lever and permitting the same to return to its initial position, the shaft 8 is rotated in a reverse direction under the influence of the spring 12, bringing the plate A in view through the windows. The notches 19 upon the plate 18 are preferably numbered 1 to 4 to correspond with the four plates carried by the shaft 8 so that upon moving the controlling lever 21 in engagement with any one of the notches on said plate, the corresponding plate 7 will be moved into view through the windows 5.

The casing 1 has secured therein spaced longitudinal partitions 23 which are connected to horizontal partitions 24. The horizontal partitions 24 connect with the front and rear walls of the casing at a point above the windows 5 while the partitions 23 extend downwardly to a point slightly below the upper edge of said windows so as to dispose the partitions 24 on an incline which are adapted to act as reflectors for reflecting the light entering the windows downwardly upon the plates 7. One of the longitudinally extending partitions 23 have formed therein an electric lamp socket 25 carrying an electric lamp 26 which is situated between the partitions so that the rays of light therefrom will be directed downwardly upon the plates 7 and upon each side of the plate that is disposed between the windows 5. The electric lamp socket 25 has connected thereto conductors 27 and 28 which extend outwardly from the compartment 11 by way of a tubular member 29 and the conductor 27 is connected to a battery or other electrical source while the conductor 28 is connected to a switch. A conductor 30 is connected to the switch and to the electrical battery so that upon closing the switch the electric lamp will be illuminated.

Side partitions 31 are formed within the casing and are disposed on an incline and engage the sides of the windows 5 to permit the plates or the characters thereon to be viewed from either side of the casing 1 as well as being viewed from the front and rear of said casing.

Projections 32 are formed on the casing at the lower edge of the window 5 and are adapted to coöperate with the plates that are disposed horizontally in preventing the rays of light from the electric lamp to enter the lower part of the casing which is not necessary to illuminate thus increasing the lighting capacity of the electric lamp against the plates. This also applies to the light rays entering the windows 5 when the device is being employed in the daytime.

The cylindrical member 29 which is formed on the bottom wall of the casing also permits the flexible housing 17 to enter the compartment 11 as well as the electrical conductors 27 and 28. The electrical conductors when passing through the compartment 11 are supported to the walls thereof by hangers or similar members 33.

While I have shown and described the preferred embodiment of my invention, it will be understood that minor changes in construction, combination, and arrangement of parts may be made without departing from the spirit and scope of the invention as claimed.

Having thus described my invention, what I claim is:—

1. An automobile signal comprising a casing having front and rear windows, a shaft journaled in said casing, plates carried by said shaft and having signaling characters thereon, a stop located in said casing, a projection carried by one of said plates and normally in engagement with the stop for holding one of said plates normally between the windows, means connected to said shaft for moving the various plates between said windows by rotating the shaft, and an automatic means connected to the shaft for returning the plates to their initial position and the extension in engagement with the stop.

2. An automobile signal comprising a casing, having front and rear windows, signaling members journaled in said casing, means actuating said signaling members, longitudinally extending partitions formed within said casing and extending to a point below the upper edge of said windows, horizontal partitions formed on the lower edges of the longitudinal partitions and the upper edges of the windows to form deflectors, side deflectors formed on the side edges of the windows and disposed at an incline to permit of the signaling members to be viewed from angles in relation to the casing.

3. An automobile signal comprising a casing having front and rear windows, a transverse partition located within said casing and forming an auxiliary compartment, a shaft journaled in said casing and partition and having one end in the compartment, signaling members carried by said shaft, a spring connected to said shaft for returning it to its initial position, a drum connected to the shaft and located within the auxiliary compartment, and means connected to the drum for rotating the shaft in one direction.

In testimony whereof I affix my signature in presence of two witnesses.

GERALD W. WAGNER.

Witnesses:
  A. A. MINDER,
  WM. A. WAGNER.